United States Patent
Zwang

[19]

[11] Patent Number: 5,938,703
[45] Date of Patent: Aug. 17, 1999

[54] EMBEDDED COMMAND MODULE WITH MATRIX SWITCH DRIVE CAPABILITY

[75] Inventor: Michael B. Zwang, Venice, Calif.

[73] Assignee: Hughes Electronics Corporation, El Segundo, Calif.

[21] Appl. No.: 08/690,694

[22] Filed: Jul. 31, 1996

[51] Int. Cl.[6] ................................................... B64G 1/00
[52] U.S. Cl. ............................ 701/3; 701/13; 244/158 R
[58] Field of Search .............................. 701/1, 3, 13, 14; 244/158 R; 333/103

[56] References Cited

U.S. PATENT DOCUMENTS

| | | | |
|---|---|---|---|
| 3,614,327 | 10/1971 | Low et al. ............................... | 179/15 A |
| 3,633,048 | 1/1972 | Kleinberg ................................. | 307/273 |
| 5,696,470 | 12/1997 | Gupta et al. ............................. | 333/103 |

*Primary Examiner*—Michael Zanelli
*Attorney, Agent, or Firm*—Georgann S. Grunebach; M. W. Sales

[57] ABSTRACT

An electronic embedded command module to control devices located in spacecraft includes a serial command decoder to decode serial digital input commands and control a switch matrix, a command buffer to provide a compatible serial digital input command to the serial command decoder, a standby circuit to control power to the serial command decoder, and a switch matrix to provide output commands. A method for controlling devices located in a spacecraft in response to a serial digital command signal. The method includes receiving the serial digital command signal, changing from an inactive state to an active state, processing the command signal while maintaining the active state, generating an output signal, and returning to the inactive state. This electronic command module controls its own power status and consumes negligible current when in the inactive state. This electronic command module reduces wire harness and command module weight and lowers system design, wire harness and command module cost.

18 Claims, 3 Drawing Sheets

EMBEDDED COMMAND MODULE WITH MATRIX SWITCH DRIVE CAPABILITY

TECHNICAL FIELD

This invention relates to electronic command devices and electrical power conservation devices used in spacecraft.

BACKGROUND ART

Spacecraft require a large number of devices for maintaining a desired orbit while performing their intended function. These devices are located in the payload area and throughout a spacecraft and may include electronic, electrical, electromechanical and ferrite devices. Command of these devices is vital to a successful mission.

Conventional control methods utilize a central command unit. This central command unit delivers numerous low current signals, each on a separate wire, to the many remotely located electronic devices. There are several disadvantages to this method. For example, this method requires the use of large, heavy and expensive wire harnesses. Furthermore, the size, weight and cost of these wire harnesses significantly restrict the possible layout or arrangement of electronic devices in the payload area. Additionally, conventional control methods have limited command capabilities.

Many spacecraft have extremely tight requirements on the weight of various spacecraft components. Reducing component weight has many attendant advantages. For example, the requirements for structural integrity and the amount of fuel required to launch a spacecraft are related to the weight of the spacecraft. Similarly, control and maintenance of an appropriate orbit may also be affected by the weight of the spacecraft.

Electrical energy used to control spacecraft and power communication equipment is often provided initially by one or more batteries and then supplemented by solar energy collected by large solar panels deployed once in orbit. Spacecraft power consumption must be carefully monitored and controlled to provide consistent, high quality communication during a mission. Power requirements also indirectly affect the weight of the spacecraft due to the necessary energy storage capacity of the batteries so that sufficient energy may be provided during periods when solar energy is reduced or unavailable.

Thus, component weight and power consumption are two important parameters of the many considerations during design and implementation of any spacecraft. It is desirable to reduce or minimize both component weight and power consumption to improve the efficiency and reduce the cost of construction and/or operation of the spacecraft based on its intended mission.

SUMMARY OF THE INVENTION

An object of the present invention is to provide an electronic command module with greatly expanded command capabilities.

Another object of the present invention is to provide an electronic command module which consumes negligible quiescent current.

Another object of the present invention is to provide an electronic command module which controls its own power status.

Another object of the present invention is to provide an electronic command module which allows for unrestricted layout or arrangement of electronic devices in the spacecraft payload area.

Another object of the present invention is to provide an electronic command module which weighs less and costs less than conventional control units.

In carrying out the above objects and other objects, features, and advantages of the present invention, an electronic command module to control devices located in spacecraft is provided. The electronic command module comprises a serial command decoder to decode serial digital input commands and control a switch matrix output, a command buffer to provide a compatible serial digital input command to the serial command decoder, a standby circuit to control power to the serial command decoder, and a switch matrix output to provide output commands.

A method is also provided according to the present invention for controlling devices on a spacecraft.

The advantages of the present invention are numerous. For example, this electronic command module controls it own power status and consumes negligible current when in a quiescent state. This electronic command module reduces wire harness and command module weight and reduces system design, wire harness, and command module cost.

The above objects and other objects, features, and advantages of the present invention will be readily apparent from the following detailed description of the best mode for carrying out the invention when taken in conjunction with the accompanying drawings.

BEST MODE FOR CARRYING OUT THE PRESENT INVENTION

Figure 1:
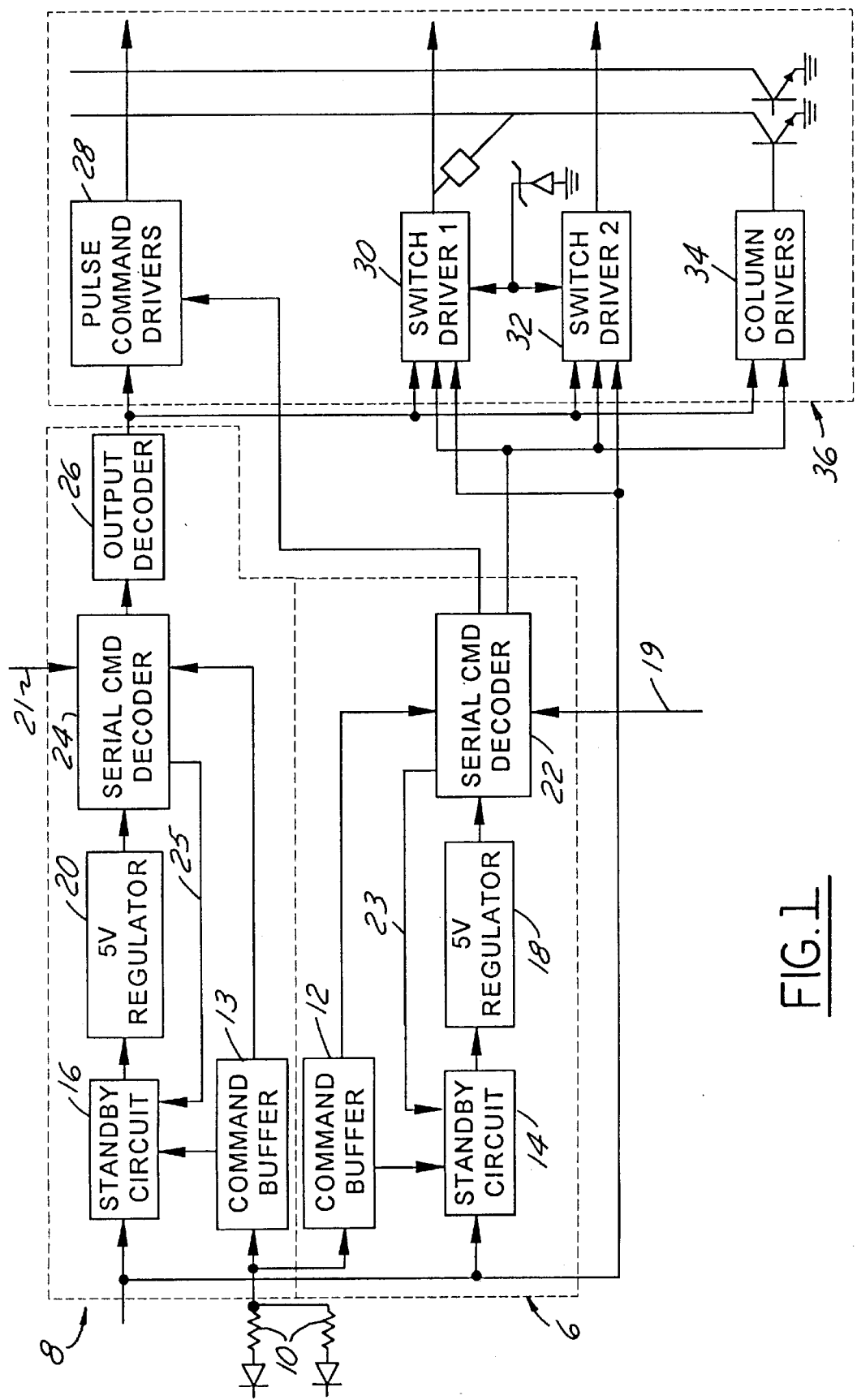
FIG. 1 is a block diagram of the embedded command module.

FIG. 1 is a block diagram illustrating an embedded command module 5 according to the present invention. The embedded command module 5 contains two electrical paths, an enabling channel 6 and a data channel 8. The enabling channel 6 includes command buffer 12, standby circuit 14, five volt regulator 18, and serial command decoder 22. The data channel 8 includes command buffer 13, standby circuit 16, five volt regulator 20, and serial command decoder 24 and output decoder 26.

A serial data input port 10 receives serial data commands. Serial data input port 10 is coupled to command buffers 12 and 13. The output of command buffer 12 is coupled to standby circuit 14 and serial command decoder 22. The output of command buffer 13 is coupled to standby circuit 16 and serial command decoder 24. Command buffers 12 and 13 function as voltage level shifters to provide compatible input signals to the serial command decoders 22 and 24, respectively. Directly coupled to each standby circuit 14 and 16 is an externally supplied fifty-two volt input.

Each standby circuit 14 and 16 includes two modes of operation: an active state and an inactive or quiescent state. While operating in the quiescent state, standby circuits 14 and 16 consume negligible current. In this state, the power consumption of command module 5 is approximately equal to the leakage current of transistors within standby circuits 14 and 16. The mode of operation for each standby circuit 14 and 16 is controlled by the first bit of an incoming serial digital input command. When a proper first bit is detected, each standby circuit 14 and 16 is switched to an active state and a fifty-two volt signal is provided to five volt regulators 18 and 20, respectively.

The outputs of five volt regulators 18 and 20 are coupled to serial command decoders 22 and 24, respectively. When either five volt regulator 18 or 20 receives a fifty-two volt signal from the respective standby circuit 14 or 16, a five volt signal is supplied to the respective serial command decoder 22 or 24 and decoding of the serial digital input command begins. To retain standby circuits 14 and 16 in the active state while the serial digital input command is being decoded, serial command decoders 22 and 24 output a "keep alive" signal to standby circuits 14 and 16 via "keep alive" paths 23 and 25, respectively.

The serial command decoders 22 and 24 receive serial digital input commands directly from the command buffers 12 and 13, respectively. A portion of a serial digital input command contains the address of the device to which the data has been sent. The first bit of a serial digital input command contains information concerning the receiving address and the mode of operation for standby circuits 14 and 16. Serial command decoders 22 and 24 are provided their address via address buses 19 and 21, respectively. Each address bus 19 and 21 contains four address lines which may each be left open or pulled low depending on the desired address of the embedded control module 5. Serial command decoders 22 and 24 verify the address within the received command. This includes comparing the address to the address indicated by address buses 19 and 21. If the address in the received command is valid, the command is executed. Verifying the address also preferably includes checking the parity and bit count of the command.

For valid commands, serial command decoder 24 outputs an eight bit digital signal directly to output decoder 26. Output decoder 26 further decodes four bits of the eight bit digital input signal to determine which output device to activate. The output signal from output decoder 26 is supplied to the pulse command drivers 28, switch driver 30, switch driver 32, and column drivers 34. The output of serial command decoder 22 is coupled to pulse command drivers 28, switch driver 30, switch driver 32, and column drivers 34.

Functionally, data channel 8 receives and decodes a serial digital input command and produces a data output signal to control the outputs of embedded command module 5. Enabling channel 6 receives and decodes the same serial digital input command and provides an enabling signal to the outputs of the embedded command module 5. This dual channel design prevents either half of the circuit from independently executing commands.

The outputs of embedded command module 5 are configured into a switch matrix 36. The switch matrix 36 consists of fifteen rows and sixteen columns. The fifteen rows consist of seven pulse command drivers 28 and eight switch drivers 30 and 32. The pulse command drivers 28 can supply one milliampere signals on their outputs. The switch drivers 30 and 32 produce three ampere outputs. The columns consist of sixteen column drivers 34. Each row and column is independently addressable. This output matrix can provide up to two hundred and forty commands (15 rows×16 columns=240).

Figure 2:
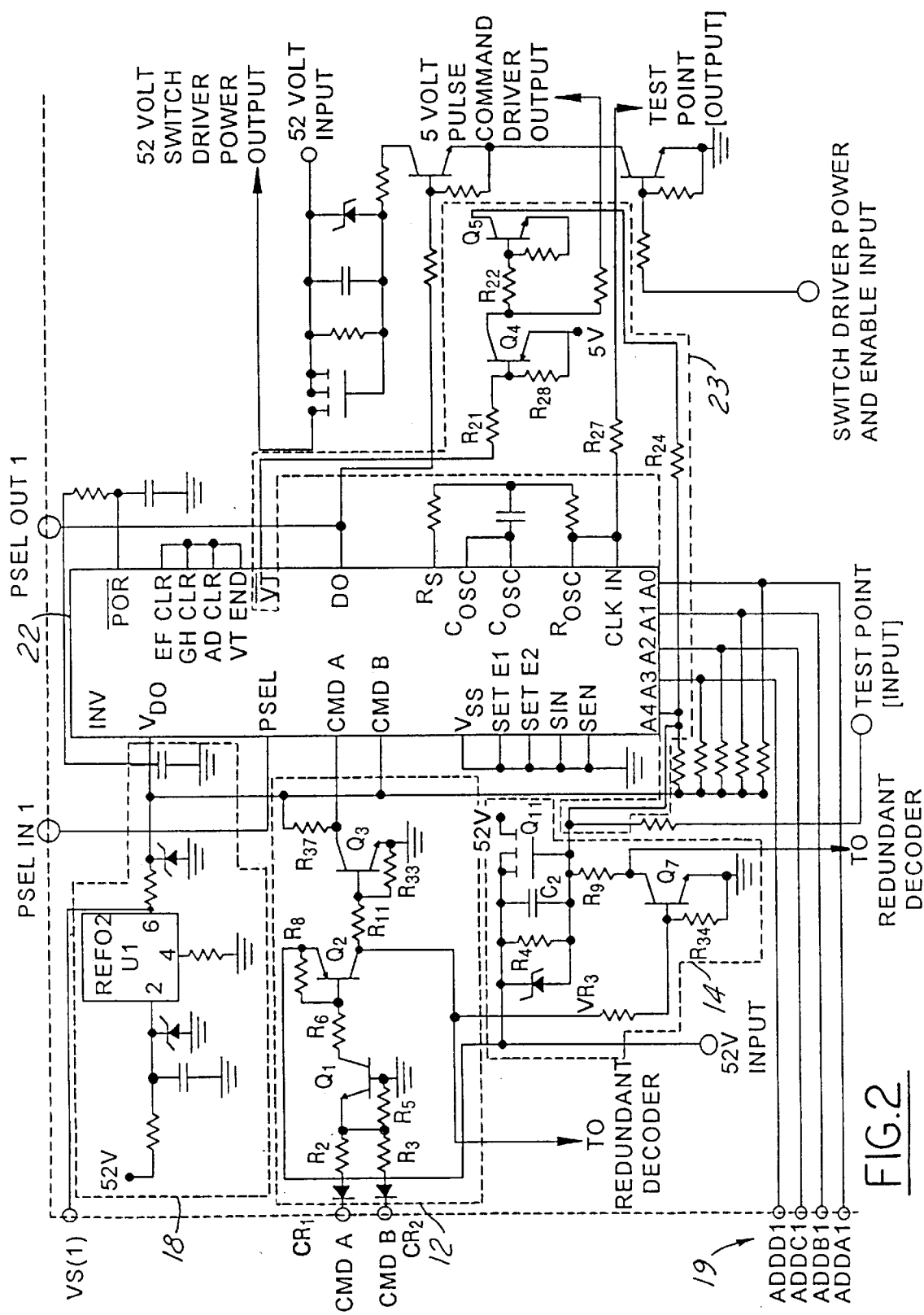
FIG. 2 is an electrical schematic of the embedded command module.

FIG. 2 is an electrical schematic of enabling channel 6 for the embedded command module 5 illustrated in FIG. 1. The data channel is construed in a similar fashion and is not specifically illustrated. Three circuits of the embedded command module 5 operate in conjunction to control its power status. These three circuits include command buffer 12, standby circuit 14, and "keep alive" path 23.

Command buffer 12 includes diodes CR1 and CR2, resistors R2, R3, R5, R6, R8, R11, R33 and R37, and transistors Q1, Q2, and Q3. Standby circuit 14 includes diode VR3, capacitor C2, resistors R4, R9, R34, and R57, and transistors Q7 and Q11. "Keep alive" path 23 begins at output VT of serial command decoder 22 and ends at the gate of transistor Q11. "Keep alive" path 23 includes resistors R21, R22, R24, R27, and R28 and transistors Q4 and Q5.

The embedded command module 5 typically operates in an inactive mode. To operate in an active mode and decode serial digital input commands, the serial command decoder 22 requires a voltage input from five volt regulator 18. Transistor Q11 of the standby circuit 14 operates as the power switch to five volt regulator 18. When the gate of transistor Q11 is pulled low, an externally supplied fifty-two volt signal passes from the source to the drain and is input to five volt regulator 18. The gate of transistor Q11 may be pulled low either through transistor Q7 of standby circuit 14 or transistor Q5 of "keep alive" path 18.

The electrical path through transistor Q7 switches the embedded command module 5 from the inactive mode to the active mode when a proper serial digital input command is first received. When a proper first bit of an incoming serial digital command reaches the base of transistor Q2, an externally supplied fifty-two volt input passes from the emitter to the collector of transistor Q2. This input then passes through resistor R57 to the base of transistor Q7. The gate of transistor Q11 is then pulled low through resistor R9 and the collector and emitter of transistor Q7.

The electrical path through transistor Q5 maintains the embedded command module 5 in the active mode until the execution of a command is complete. While a command is being executed, the gate of transistor Q11 is pulled low through R24 and the collector and emitter of transistor Q5.

Power to serial command decoder 24 of data channel 8 is controlled in a similar manner as described for serial command decoder 22 of enabling channel 6.

Figure 3:
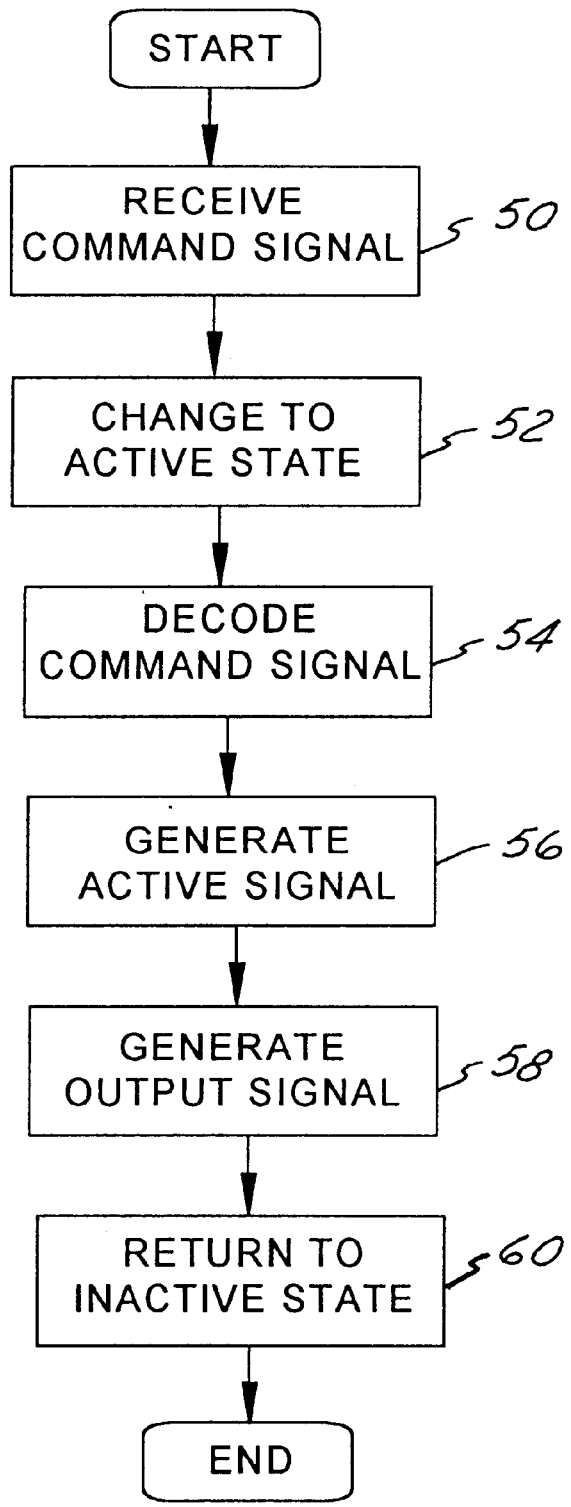
FIG. 3 is a flow chart illustrating a method for controlling spacecraft modules according to the present invention.

Referring now to FIG. 3, a flow chart illustrating a method for controlling devices on spacecraft according to the present invention is shown. As will be appreciated by one of ordinary skill in the art, although the flow chart illustrates sequential steps, the particular order of processing is not important to achieving the objects of the present invention. As will also be recognized, the method illustrated may be performed in software, hardware, or a combination of both such as an application specific integrated circuit as in a preferred embodiment of the present invention.

A serial digital command signal is received as represented by block 50 of FIG. 3. The system changes from an inactive (or quiescent) state to an active state as illustrated by block 52. The inactive state is characterized by low power consumption while the active state consumes significantly more power due to actuation of one or more of the devices on the spacecraft. Preferably, the inactive state has a minimal current draw which is orders of magnitude less than the active state. In a preferred embodiment, the current draw while in the inactive state is due only to the leakage current of the transistors utilized in the command control module.

The received command signal is processed as represented by block 54 which includes decoding the command signal to determine an address and a control command. If the address matches the predetermined address of the control module, then a "keep alive" or active signal is generated to maintain the active state during processing as represented by block 56. Processing of the command signal also preferably includes parity checking and bit counting to determine if a valid control command and address have been received and decoded. The control command determines which of the spacecraft devices to actuate.

In one embodiment of the present invention, the command signal is processed by two independent (non-monolithic) decoders to provide dual channel decoding redundancy. As such, if the control command and address decoded by both decoders do not match, no output device is actuated. If a valid command and address are decoded, an output signal is generated as represented by block 58 based on the control command to actuate one of the devices on the spacecraft. In one embodiment of the present invention, the devices are connected to corresponding row and column drivers and the output signal includes a row signal and a column signal to select one of the devices. Once the decoded command is executed, the system returns to an inactive state as represented by block 60.

It is to be understood, of course, that while the forms of the invention described above constitute the best mode contemplated of practicing of the present invention, the preceding description is not intended to illustrate all possible forms thereof. It is also to be understood that the words used are words of description, rather than of limitation, and that various changes may be made without departing from the spirit and scope of the present invention, which should be construed according to the following claims.

What is claimed is:

1. A command module for controlling a plurality of devices located in a spacecraft, the command module comprising:
   a standby circuit for receiving a command signal to control at least one of the plurality of devices, the standby circuit changing from an inactive state to an active state upon receiving the command signal, remaining in the active state during processing of the command signal, and returning to the inactive state after processing the command signal;
   a serial command decoder coupled to the standby circuit for processing the command signal and generating a plurality of signals to selectively actuate at least one of the plurality of devices based on the command signal, the serial command decoder also providing a feedback signal to the standby circuit during processing of the command signal; and
   a switch matrix coupled to the serial command decoder for receiving the plurality of signals and generating an output signal to actuate one of the plurality of devices based upon a unique combination of the plurality of signals.

2. The command module of claim 1 further comprising:
   a command buffer in communication with a serial data input line, the standby circuit, and the serial command decoder, for conditioning the command signal received on the serial data input line.

3. The command module of claim 1 wherein the command signal includes a command module address and a command intended for at least one of the plurality of devices and wherein the serial command decoder includes logic for comparing the command module address to a predetermined address associated with the command module.

4. The command module of claim 3 wherein the serial command decoder provides the feedback signal to the standby circuit only during processing of a valid command signal.

5. The command module of claim 1 wherein the switch matrix comprises:
   at least one switch driver for providing an output signal of about three amperes; and
   at least one pulse driver for providing an output signal of about one milliampere.

6. The command module of claim 5 wherein the at least one switch driver and the at least one pulse driver define a corresponding plurality of rows, and wherein the switch matrix further comprises:
   at least one column driver which defines a corresponding at least one column wherein the unique combination includes one of the plurality of rows and one of the at least one columns.

7. The command module of claim 6 wherein the row drivers and the at least one column driver are independently addressable.

8. The command module of claim 1 wherein the serial command decoder comprises an application specific integrated circuit.

9. The command module of claim 1 further comprising:
   an output decoder in communication with the serial command decoder and the switch matrix for determining the unique combination of the plurality of signals.

10. A command module for controlling a plurality of devices located in a spacecraft in response to a serial digital command signal received on a command input line, the command module comprising:
    first and second command buffers in communication with the command input line for conditioning the command signal for processing;
    first and second standby circuits in communication with the first and second command buffers, respectively, the standby circuits changing from an inactive state to an active state upon receiving the command signal, and returning to the inactive state after processing the command signal;
    first and second serial command decoders coupled to the first and second standby circuits, respectively, for processing the command signal and each generating at least one signal to selectively actuate at least one of the plurality of devices based on the command signal, the serial command decoders also providing corresponding first and second feedback signals to the first and second standby circuits, respectively, during processing of the command signal;
    an output decoder in communication with the first serial command decoder for generating a plurality of output signals based on the command signal;
    a switch matrix in communication with the output decoder and in communication with the second serial command decoder for receiving the plurality of output signals and the at least one signal from the second serial command decoder and generating an actuation signal to actuate one of the plurality of devices based upon a unique combination of the plurality of signals.

11. The command module of claim 10 wherein the first and second serial command decoders provide the first and second feedback signals to the first and second standby circuits only during processing of a valid command signal.

12. The command module of claim 11 wherein the switch matrix comprises:
    at least one switch driver for providing an output signal of about three amperes; and
    at least one pulse driver for providing an output signal of about one milliampere.

13. The command module of claim 10 wherein the switch matrix comprises:
   at least one switch driver;
   at least one pulse driver; and
   at least one column driver, wherein the at least one switch driver and the at least one pulse driver define a corresponding plurality of rows, and the at least one column driver defines a corresponding at least one column and wherein the plurality of output signals energizes one of the plurality of rows and one of the at least one columns.

14. The command module of claim 13 wherein the row drivers and the at least one column driver are independently addressable.

15. A method for controlling a plurality of devices located in a spacecraft in response to a serial digital command signal, the method comprising:
   receiving the serial digital command signal;
   changing from an inactive state characterized by low power consumption to an active state upon receiving the command signal;
   processing the command signal to determine which of the plurality of devices to actuate while providing an active signal to maintain the active state;
   generating a plurality of output signals to control the plurality of devices based on the processing wherein the plurality of output signals is less in number than the plurality of devices; and
   returning to the inactive state when the active signal is no longer received.

16. The method of claim 15 wherein processing comprises:
   decoding the command signal to determine an address and a control command;
   comparing the address to a predetermined command module address; and
   providing the active signal only if the comparing indicates that the address matches the predetermined command module address.

17. The method of claim 15 wherein processing comprises processing the command signal using first and second decoders and wherein generating the plurality of output signals is performed only if both the first and second decoders indicate a valid control command has been decoded.

18. The method of claim 15 wherein each of the plurality of devices is associated with a row and a column and wherein generating the plurality of output signals comprises generating a row signal and a column signal to select one of the plurality of devices.

* * * * *